United States Patent Office 2,731,464
Patented Jan. 17, 1956

2,731,464
PRODUCTION OF VAT DYESTUFFS

Friedrich Ebel, Mannheim-Feudenheim, Walter Rupp, Ludwigshafen (Rhine-Oppau), and Walter Keller, Ludwigshafen (Rhine), Germany, assignors to Badische Anilin- & Soda-Fabrik Aktiengesellschaft, Ludwigshafen (Rhine), Germany No Drawing. Application September 4, 1952,
Serial No. 307,902

Claims priority, application Germany September 20, 1951

6 Claims. (Cl. 260—256.4)

This invention relates to vat dyestuffs of the anthraquinone series, in particular to amide like compounds of 1-amino-2-acetylanthraquinone.

We have found that valuable vat dyestuffs are obtained when 1-amino-2-acetylanthraquinones which contain an amino group in at least one further α-position and which may also contain other substituents in the anthraquinone nucleus, such as halogen atoms, methoxy groups, cyano groups or hydrocarbon radicals, are condensed to amide-like compounds.

This may be effected for example by reacting the 1-amino-2-acetylanthraquinones of the said kind either with carboxylic acid halides or with heterocyclic compounds containing the grouping

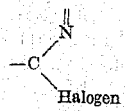

at least one in a ring, which in general behave like carboxylic acid halides. Both kinds of "acylating" groups, namely

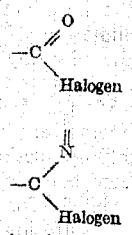

and may also be present simultaneously in the molecule of the "acylating" compound.

Suitable "acylating" agents of the said kind are for example oxalyl chloride, fumaryl chloride, chlorfumaryl chloride, benzoyl chlorides, acetyl chloride, propionyl chloride, butyryl chloride, stearic acid chloride, terephthaloyl bromide, isophthaloyl chloride, chlor-isophthaloyl chloride, naphthalene-2,6-dicarboxylic acid chloride, diphenyl-4-carboxylic chloride, diphenyl-4,4'-dicarboxylic chloride, azobenzene-4,4'-dicarboxylic acid chloride, trimesic acid chloride, pyridine-3- and 4-carboxylic acid chloride, quinoline-6-carboxylic acid chloride, anthraquinone-2-carboxylic acid chloride, 1-aminoanthraquinone-2-carboxylic acid chloride, 1-benzoylaminoanthraquinone-3-carboxylic acid chloride, 1,9-thiazolanthrone-2-carboxylic acid chloride, 3,4-phthaloylacridone-7-carboxylic acid chloride, 2,4-dichloropyrimidine, 2,4-dibrompyrimidine, 2,4-dichlor-6-methylpyrimidine, 2,4-dichlor-6-phenylpyrimidine, 2,5 - dichlorpyrazine, 2,6 - dichlor - 4-methyl-1,3,5-triazine, 2,4-dichlorquinazoline, 2,4-dichlor-6,7-benzquinazoline, 2,4-dichlor-6,7-phthaloylquinazoline, 2-phenyl-4-chlor-6,7-phthaloylquinazoline, 2-(anthraquinonyl-2')-4-chlorquinazoline, 1,3-di(4'-chlor-6',7'-phthaloylquinazolyl-2')-benzene, 1,4-dichlorphthalazine, 4,4'-dichlor-6,6'-diphenyl-1,1'-3,3'-bis-diazine, cyanuric acid chloride, cyanuric acid bromide, trichlorpurine or 2-chlorquinoline-4-carboxylic acid chloride.

The reaction of the said acylating agents with the amino-acetylanthraquinones is preferably effected by heating in an inert solvent of high boiling point until no more hydrogen halide escapes. It is also possible to work without solvent by combining the reactants in a baking process or by allowing the reaction to proceed in an excess of the acylating agent. The co-employment of acid-binding agents, such as potash, sodium acetate, sodium sulfite or pyridine, is generally speaking unnecessary, but their addition may be of advantage in some cases. The reaction temperature lies between 70° and 250° C., generally between 120° and 210° C.

The relative proportions are advantageously chosen so that for example an equivalent of acylating agent reacts on 1 mol of diamino-2-acetylanthraquinone, for it is preferable to react only the amino group in the 4, 5 or 8 position, while the amino group adjacent to the acetyl group in the 1-position remains free. The dyestuffs thus obtainable are more valuable than those dyestuffs in which the amino group in 1-position is also acylated and which can be obtained by employing a larger amount of acylating agent and more vigorous reaction conditions. Polyfunctional acylating components can be reacted with only one mol of, for example, diamino-2-acetylanthraquinone and the other equivalent of the acylating component saturated by any other amine, as for example by aniline or 1-aminoanthraquinone. In this way different amines can be added simultaneously or consecutively in any sequence to the reaction mixture.

The dyestuffs obtained dye natural and regenerated cellulose, and also polyamides, from a cold or hot vat in uniform deep red to black shades of high fasteness to chlorine in which they are superior to known dyestuffs of these shades of colour.

The following examples will further illustrate this invention but the invention is not restricted to these examples. The parts are by weight.

Example 1

28 parts of 1,4-diamino-2-acetylanthraquinone (1 mol) are dissolved hot in 800 parts of o-dichlorbenzene; it is then cooled to 100° C., 14 parts of benzoyl chloride (1 mol) are introduced, the mixture is heated for 2 hours at 180° C. while stirring and then allowed to cool. The deposited dyestuff is filtered off by suction, washed with benzene and dried. By careful dissolution in cold concentrated sulfuric acid and precipitation in ice-water, it is brought into fine dispersion. It dyes cotton clear, blue shades fast to chlorine from a brown-red cold vat.

Similar dyestuffs are obtained by employing alkylbenzoylchlorides or alkoxybenzoylchlorides or chlorbenzoylchlorides or brombenzoylchlorides or diphenyl-4-carboxylic acid chloride or pyridin-3- or 4-carboxylic acid chloride or naphthalene-2-carboxylic acid chloride instead of benzoylchloride.

Example 2

28 parts (1 mol) of 1,4-diamino-2-acetylanthraquinone are dissolved hot in 780 parts of nitrobenzene. With the temperature at 130° C., 10.1 parts (0.5 mol) of isophthaloyl chloride are added, the temperature is raised to 180° C. and the mixture stirred for 2 hours at this temperature. It is then allowed to cool and the deposited dyestuff is filtered off by suction, washed with nitrobenzene and then with methanol. After drying, 34 parts of a finely-crystalline blue powder are obtained which by dissolution in and precipitation from concentrated sulfuric acid can be brought into fine dispersion. The new dyestuff dyes cotton fast blue shades from a brown-red vat.

Similar dyestuffs are obtained by replacing isophthaloylchloride by terephthaloylchloride or diphenyl-4,4'-dicar-

Example 3

28 parts (1 mol) of 1,4-diamino-2-acetylanthraquinone are dissolved in 800 parts of nitrobenzene at 130° C. 15 parts of fused, powdered sodium acetate and 27 parts (1 mol) of anthraquinone-2-carboxylic acid chloride are added and the mixture heated to boiling for 3 hours while stirring. It is then allowed to cool to 60° C. and the deposited dyestuff is filtered off by suction and washed with methanol and water. After drying, 40 parts of a dyestuff are obtained which dyes cotton reddish-blue shades from a hot brown vat.

Similar dyestuffs are obtained by employing instead of anthraquinone-2-carboxylic acid chloride 1-amino- and 1-nitroanthraquinone-2-carboxylic acid chloride or 1-amino- or 1-nitro- or 1-acylamino-anthraquinone-3-carboxylic acid or 1,9-thiazolanthrone-2-carboxylic acid chloride or 1,9-anthrapyrimidine-2-carboxylic acid chloride.

Example 4

A mixture of 28 parts (1 mol) of 1,4-diamino-2-acetyl-anthraquinone, 8.1 parts (0.5 mol) of 2,4-dichlor-6-methylpyrimidine and 500 parts of nitrobenzene is heated for 2 hours at 180° C. while stirring. After cooling, the deposited dyestuff is filtered off by suction, thoroughly washed with nitrobenzene and then with methanol and dried. 28 parts of a dyestuff are obtained which dyes cotton fast blue shades from an olive-green vat.

Example 5

28 parts (1 mol) of 1,4-diamino-2-acetylanthraquinone are dissolved in 500 parts of nitrobenzene, then 11.2 parts (0.5 mol) of 2,4-dichlor-6-phenylpyrimidine are added and the mixture is stirred for 2 hours at 180° C. After working up in the usual way, a dyestuff is obtained which dyes cotton clear blue shades from an olive-green vat.

Example 6

A mixture of 28 parts (1 mol) of 1,4-diamino-2-acetyl-anthraquinone, 11.6 parts (0.5 mol) of 2,4,6-trichlor-quinazoline and 500 parts of nitrobenzene is heated at 180° C. for 2 hours while stirring. After working up in the usual way, 30 parts of a dyestuff are obtained which dyes cotton fast blue shades from an olive-green vat.

By employing 10 parts (0.5 mol) of 2,4-dichlorquin-azoline instead of 2,4,6-trichlorquinazoline, a fast blue vat dyestuff is also obtained. With 12.5 parts (0.5 mol) of 2,4-dichlor-6,7-benzquinazoline, a blue-green dyestuffs is obtained.

Example 7

A mixture of 28 parts (1 mol) of 1,4-diamino-2-acetyl-anthraquinone 12.5 parts (0.5 mol) of 2,6-dichlor-8,9-benzpteridine (obtainable by the reaction of alloxazine with phosphorus pentachloride in boiling phosphorus oxychloride) and 500 parts of nitrobenzene is heated at 180° C. for 2 hours while stirring. After the usual working up, 35 parts of a greenish-black dyestuff are obtained which dyes cotton green-black shades of excellent fastness from an olive-green vat.

From 28 parts (1 mol) of 1,4-diamino-2-acetylanthraquinone and 10 parts (0.5 mol) of dichlorphthalazine, there are formed in the said manner 30 parts of a dyestuff which dyes cotton currant-colored brown shades.

Example 8

A mixture of 28 parts (1 mol) of 1,4-diamino-2-acetyl-anthraquinone, 6.5 parts (0.35 mol) of cyanuryl chloride and 600 parts of nitrobenzene is heated at 180° C. for 2 hours while stirring. After the usual working up, 28 parts of a dyestuff are obtained which dyes cotton powerful reddish-blue shades from an olive-green vat.

Example 9

19.9 parts (1 mol) of 2,4-dichlorquinazoline are dissolved in 500 parts of nitrobenzene. 28 parts (1 mol) of 1,4-diamino-2-acetylanthraquinone are then added in the cold and the whole heated during the course of an hour to 140° C. At this temperature it is stirred for a further hour. Then 22.3 parts (1 mol) of 1-aminoanthraquinone are introduced and the temperature is raised to 180° C. at which it is again stirred for an hour. It is then allowed to cool and the deposited dyestuff is filtered off by suction, washed with nitrobenzene and methanol and dried. 55 parts of a grey, finely-crystalline dyestuff are obtained which dyes cotton neutral grey shades of very good fastness properties from a brown vat.

Example 10

28 parts (1 mol) of 1,5-diamino-2-acetylanthraquinone are dissolved in 700 parts of nitrobenzene at 130° C. 7.6 parts (0.5 mol) of fumaryl chloride are then added and the mixture stirred for 2 hours at 180° C. After cooling, the deposited dyestuff is filtered off by suction, washed with methanol and dried. 29 parts of a red crystalline dyestuff are obtained which dyes cotton or polyamide fibres powerful clear red shades from a cold violet vat.

A similar dyestuff is obtained by using the equivalent amount of chlorfumaryl chloride, acetyl chloride, propionyl chloride, or butyryl chloride instead of fumaryl chloride.

The hitherto unknown 1,5-diamino-2-acetylanthraquinone (used as initial material) is prepared as follows:

20 parts of 2-ethylanthraquinone are dissolved in 250 parts of monohydrate at 80° C. Into the resulting solution, while stirring well, there is allowed to flow during the course of 25 minutes a mixture of 20 parts of 98% nitric acid and 80 parts of sulfuric acid monohydrate. Towards the end of the introduction, the dinitro compound begins to precipitate out. The introduction is accelerated so that all the nitrating acid has been incorporated before the mass becomes viscous. The temperature remains at 80° to 85° C. It is stirred for a further 10 minutes at this temperature, allowed to cool and the precipitate is filtered off by suction and the filter cake washed with concentrated sulfuric acid until the filtrate running away is pale yellow, for which purpose about 200 parts of concentrated sulfuric acid are required. The filter residue is then added to 50 parts of ice-water, heated therein for 15 minutes at 90° C., again filtered by suction, washed until neutral and dried. 7.5 parts of 1,5-dinitro-2-ethylanthraquinone are thus obtained as a canary-yellow powder having a melting point of 302° to 303° C. The mother liquor contains the 1,8-dinitro compound which is recovered separately (see Example 19).

10 parts of the 1,5-dinitro-2-ethylanthraquinone thus obtained are mixed with 150 parts of 40% oleum while cooling externally. It is stirred for half an hour and then 220 parts of 90% sulfuric acid and a solution of 50 parts of crystallised iron sulfate in 100 parts of water are added. Upon stirring on the waterbath, the orange-yellow color of the intermediately-formed isoxazole disappears and is replaced by a brown color (1-amino-5-nitro-2-acetylanthraquinone). It is precipitated in ice-water, filtered off by suction and washed until neutral. The filter cake, while still moist, is made into a paste with 100 to 200 parts of water. 15 parts of crystallised sodium sulfide are then added and the mixture boiled. By filtering off by suction, washing until neutral and drying there are obtained 8.5 parts of 1,5-diamino-2-acetyl-anthraquinone in the form a red-brown powder having a melting point of 250° to 252° C., which acquires a greenish surface lustre when rubbed. The compound crystallises from nitrobenzene in lustrous, brown needles which glisten green, and which melt at 255° C.

Example 11

28 parts (1 mol) of 1,5-diamino-2-acetylanthraquinone in 800 parts of nitrobenzene are heated at 180° C. while stirring for 1½ hours with 10.2 parts (0.5 mol) of a mixture of isophthaloyl- and terephthaloyl-chlorides (70:30). After the usual working up, 31 parts of a dyestuff are obtained which dyes cotton powerful red-brown shades from a Bordeaux-violet vat.

With 11.9 parts (0.5 mol) of the chloride of 1-chlorisophthalic acid-2,4 there is obtained in a corresponding way a dyestuff which dyes cotton dull red shades. With 13.7 parts (0.5 mol) of diphenyl-3,3'-dicarboxylic acid chloride there is obtained a dyestuff which dyes cotton full bluish-red-brown shades.

Example 12

A mixture of 28 parts (1 mol) of 1,5-diamino-2-acetylanthraquinone, 31.6 parts (1 mol) of 1-nitroanthraquinone-2-carboxylic acid chloride and 1000 parts of o-dichlorbenzene is heated for 2 hours at 180° C. while stirring. After cooling to 60° to 70° C., the deposited dyestuff is filtered off by suction, and washed with diclorbenzene and then with methanol. After drying, 49 parts of a currant-colored dyestuff are obtained which dyes cotton powerful red shades from a cold or hot red vat.

Example 13

A mixture of 28 parts (1 mol) of 1,5-diamino-2-acetylanthraquinone, 38.8 parts (1 mol) of 3,4-phthaloyl-acridone-7-carboxylic acid chloride and 800 parts of nitrobenzene is heated for 2 hours at 180° C. while stirring. The deposited dyestuff is filtered off by suction, washed with methanol and dried. 60 parts of a dyestuff are obtained which dyes cotton powerful red-brown shades from a black-violet vat.

Example 14

A mixture of 28 parts (1 mol) of 1,5-diamino-2-acetylanthraquinone, 10 parts (0.5 mol) of 2,4-dichlorquinazoline and 500 parts of nitrobenzene is heated for 2 hours at 180° C. while stirring. After the usual working up, 32 parts of a dyestuff are obtained which dyes cotton powerful ruby-red shades from a violet vat.

Example 15

A mixture of 28 parts (1 mol) of 1,5-diamino-2-acetylanthraquinone, 700 parts of o-dichlorbenzene and 9.15 parts (0.5 mol) of cyanuryl chloride is heated for 1.5 hours at 180° C. while stirring. Then 5 parts (0.54 mol) of aniline are added and the whole stirred for another hour at 180° C. The deposited dyestuff is then filtered off by suction, washed well with hot dichlorbenzene and then with cold methanol and dried. It dyes cotton currant-colored shades from a brown-violet vat.

With 11.3 parts (0.5 mol) of 2-chlorquinoline-4-carboxylic acid chloride there are obtained in a corresponding manner 32 parts of a dyestuff which dyes cotton currant-colored red shades from the vat.

Example 16

A mixture of 32 parts (1 mol) of 1,5-diamino-4-chlor-2-acetylanthraquinone (prepared by treating the 1-amino-5-nitro-2-acetylanthraquinone of melting point 294° to 295° C. obtainable according to the last paragraph of Example 10 with sulphonyl chloride in nitrobenzene and reducing the 1-amino-4-chlor-5-nitro-2-acetylanthraquinone of melting point 285° C. with sodium sulfide to 1,5-diamino-4-chlor-2-acetylanthraquinone of melting point 272° C.), 12 parts (0.5 mol) of isophthaloyl chloride and 500 parts of nitrobenzene is heated for 2 hours at 180° C. while stirring. After the usual working up, a dyestuff is obtained which dyes cotton beautiful ruby-red shades from a violet vat.

A dyestuff giving Bordeaux-red dyeings is obtained in a similar way with 2,4-dichlorquinazoline.

Example 17

A mixture of 29.5 parts (1 mol) of 1,4,5-triamino-2-acetylaminoanthraquinone (prepared from the 1-amino-5-nitro-4-chlor-2-acetylanthraquinone described in Example 16 by reaction with p-toluene sulfonamide and saponification of the 1-amino-5-nitro-4(p-toluene-sulfon-amido)-2-acetylanthraquinone first obtained to 1,4-diamino-5-nitro-2-acetylanthraquinone of melting point 255° C. and then reducing this compound with sodium sulfide to 1,4,5-triamino-2-acetylanthraquinone of melting point above 320° C.), 28 parts of benzoyl chloride (2 mols) and 800 parts of nitrobenzene is boiled for 3 hours while stirring. The dyestuff of melting point 269° to 270° C. separated in the usual way dyes cotton blue-grey shades of very good fastness properties from a violet vat.

Example 18

A mixture of 29.6 parts (1 mol) of 1,5-diamino-8-hydroxy-2-acetylanthraquinone (obtainable by treating the 1,5-dinitro-2-acetylanthraquinone described in Example 10 for 2 hours at 20° C. with 65% oleum and further treatment of the compound obtained by precipitation with water, consecutively with ferrous sulfate and sodium sulfide; dark red-brown crystals which sublime at about 300° C. with a blue color), 10.1 parts (0.5 mol) of isophthaloyl chloride and 800 parts of nitrobenzene is heated for 1½ hours at 180° C. while stirring. After the usual working up, 35 parts of a violet dyestuff are obtained which dyes cotton from the vat brilliant violet shades which, however, are not fast to washing and chlorine by reason of the free hydroxyl groups contained in the dyestuff.

Example 19

A mixture of 28 parts (1 mol) of 1,8-diamino-2-acetylanthraquinone, 10.2 parts (0.5 mol) of isophthaloyl chloride and 800 parts of nitrobenzene is heated for 1½ hours at 180° C. while stirring. After the usual working up, 31 parts of a dyestuff are obtained which dyes cotton clear ruby-red shades from an olive-black vat.

The abovementioned 1,8-diamino-2-acetylanthraquinone is obtained from the mother liquor containing 1,8-dinitro-2-ethylanthraquinone described in the penultimate paragraph of Example 10 in a similar manner to that described for the preparation of 1,5-diamino-2-acetylanthraquinone in the said Example 10. The 1,8-dinitro-2-acetylanthraquinone first obtained melts at 238° C. to 240° C. and the 1,8-diamino-2-acetylanthraquinone obtained therefrom by consecutive treatment with oleum, ferrous sulfate and sodium sulfide melts at 234° to 235° C.; it forms brown crystals with a green surface lustre.

Example 20

A mixture of 28 parts of 1,4-diamino-2-acetylanthraquinone (1 mol), 37 parts of 2-phenyl-4-chloro-6,7-phthaloylquinazoline (1 mol) and 800 parts of nitrobenzene is heated to 180° C. for 3 hours while stirring. After cooling the precipitated dyestuff is filtered off by suction, washed with nitrobenzene and methanol and then dried. There are obtained 61 parts of a dyestuff which dyes cotton green shades from an olive brown vat.

What we claim is:

1. A compound selected from the group consisting of the compounds having the following structural formulas: and
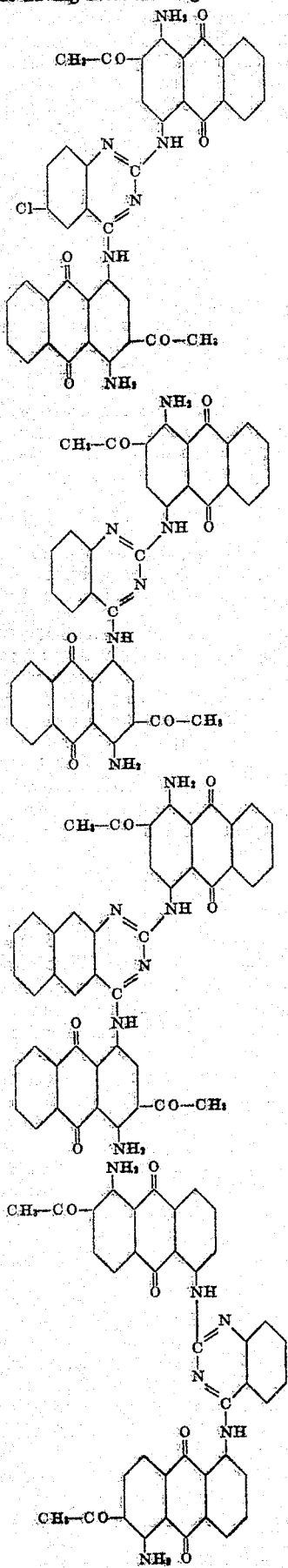
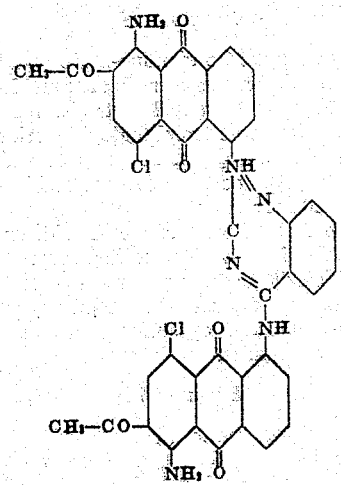
2. The compound
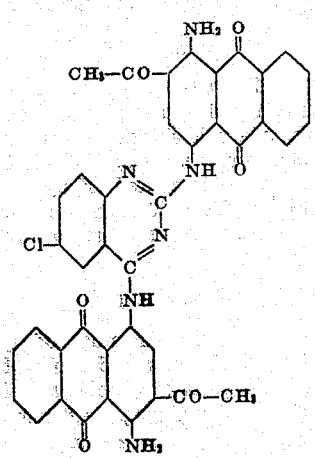
3. The compound
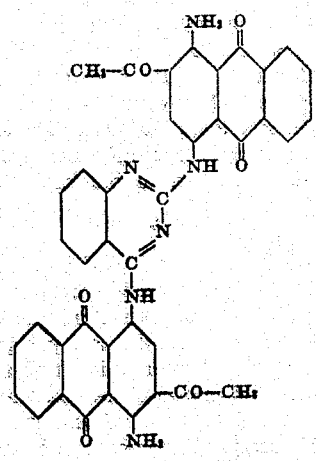

4. The compound
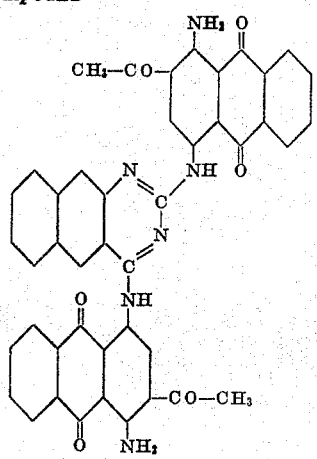
5. The compound
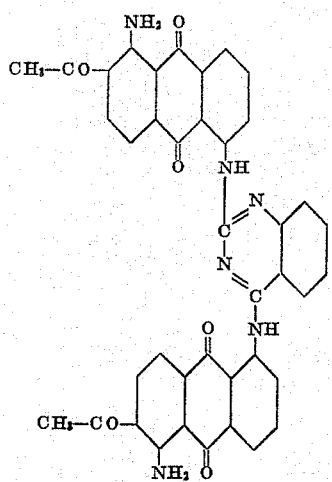
6. The compound
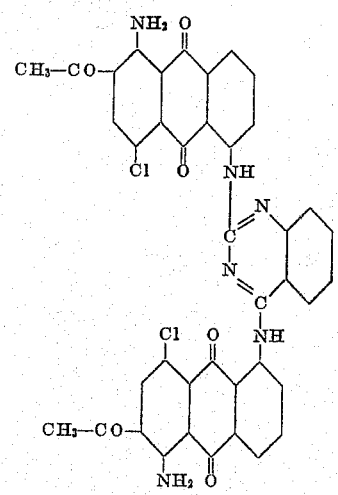
References Cited in the file of this patent
UNITED STATES PATENTS
2,299,141    Hauser _____ Oct. 20, 1942
2,567,821    Moergeli _____ Sept. 11, 1951